(12) United States Patent
Han et al.

(10) Patent No.: US 11,438,900 B2
(45) Date of Patent: Sep. 6, 2022

(54) INFORMATION TRANSMISSION METHOD AND DEVICE, PROCESSOR, AND STORAGE MEDIUM

(71) Applicant: ZTE CORPORATION, Guangdong (CN)

(72) Inventors: Xianghui Han, Guangdong (CN); Shuqiang Xia, Guangdong (CN); Wei Gou, Guangdong (CN); Chunli Liang, Guangdong (CN); Jing Shi, Guangdong (CN); Min Ren, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 159 days.

(21) Appl. No.: 16/763,942

(22) PCT Filed: Nov. 13, 2018

(86) PCT No.: PCT/CN2018/115279
§ 371 (c)(1),
(2) Date: May 13, 2020

(87) PCT Pub. No.: WO2019/096135
PCT Pub. Date: May 23, 2019

(65) Prior Publication Data
US 2020/0367254 A1   Nov. 19, 2020

(30) Foreign Application Priority Data
Nov. 17, 2017   (CN) .......................... 201711147183.X

(51) Int. Cl.
*H04W 72/04*   (2009.01)
*H04B 1/713*   (2011.01)
(Continued)

(52) U.S. Cl.
CPC ........ *H04W 72/0493* (2013.01); *H04B 1/713* (2013.01); *H04L 1/1819* (2013.01);
(Continued)

(58) Field of Classification Search
CPC ......... H04W 72/0493; H04W 72/0446; H04W 72/1284; H04B 1/713; H04L 1/1819; H04L 5/0055; H04L 5/0092
(Continued)

(56) References Cited

U.S. PATENT DOCUMENTS

2020/0245336 A1 *   7/2020   Matsumura ........... H04W 80/08

FOREIGN PATENT DOCUMENTS

CN   103283171 A   9/2013
JP   2014501079 A   1/2014

OTHER PUBLICATIONS

R1-161902.pdf (Year: 2016).*
(Continued)

*Primary Examiner* — Yemane Mesfin
*Assistant Examiner* — Intekhaab A Siddiquee
(74) *Attorney, Agent, or Firm* — KDB Firm PLLC

(57) ABSTRACT

Provided are an information transmission method and device, a processor, and a storage medium. The method includes: a terminal receives a ratio resource configured by a network; the terminal obtains a resource set according to the radio resource; and the terminal transmits uplink information by using one or more resource groups in the resource set, wherein the number of resource groups Y in the resource set is greater than or equal to 2 a terminal receiving radio resources configured by a network side; the terminal acquiring a resource set according to the radio resources; and the terminal sending uplink information by using one or more resource groups in the resource set, where the number Y of (Continued)

resource groups in the resource set is greater than or equal to 2.

13 Claims, 3 Drawing Sheets

(51) Int. Cl.
  *H04W 72/12* (2009.01)
  *H04L 1/18* (2006.01)
  *H04L 5/00* (2006.01)
(52) U.S. Cl.
  CPC .......... *H04L 5/0055* (2013.01); *H04L 5/0092* (2013.01); *H04W 72/0446* (2013.01); *H04W 72/1284* (2013.01)
(58) Field of Classification Search
  USPC ........................................................ 370/329
  See application file for complete search history.

(56) References Cited

OTHER PUBLICATIONS

R1-1718307.pdf (Year: 2017).*
R1-1717382.pdf (Year: 2017).*
Intel Corporation. "R1-1717382, Short PUCCH for4 UCI up to 2 bits" 3GPP TSG RAN WG1 Meeting 90bis, Oct. 3, 2017 (Oct. 3, 2017).
International Search Report for the International Patent Application No. PCT/CN2018/115279, dated Jan. 30, 2019, 2 pages.
ZTE, Sanechips, "Remaining issues on sPUCCH format design" 3GPP TSG RAN WG1 Meeting #90bis—R1-1717703, Prague, Czech Republic, Oct. 9-13, 2017, 5 pages.
Japanese OA for the Japanese Patent Application No. 2020-526590, dated May 24, 2021, 2 pages.
European Search Report for EP18878340.1 dated Jul. 23, 2021.
Intel Corporation: "UCI and DL HARQ-ACK feedback for NB-IoT", 3GPP Draft; R1-161902—Intel NB-Iot UCI DLHARQ, 3rd Generation Partnership Project (3GPP), Mobile Competence Centre; 650, Route Des Lucioles; F-06921 Sophia-Antipolis Cedex; France.
Nokia et al: "Remaining details of Long PUCCH with small UCI payload", 3GPP Draft; RI-1718307 Long Pucch With Small Payload, 3rd Generation Partnership Project (3GPP), Mobile Competence Centre; 650, Route Des Lucioles ; F-06921 Sophia-Antipolis Cedex; France.

* cited by examiner

INFORMATION TRANSMISSION METHOD AND DEVICE, PROCESSOR, AND STORAGE MEDIUM

CROSS-REFERENCE TO RELATED APPLICATIONS

This a National Stage Application, filed under 35 U.S.C. 371, of International Patent Application No. PCT/CN2018/115279, filed on Nov. 13, 2018, which claims priority to a Chinese patent application No. 201711147183.X filed on Nov. 17, 2017, the disclosures of which are incorporated herein by reference in their entireties.

TECHNICAL FIELD

The present disclosure relates to, but is not limited to, the field of communications, and in particular to an information transmission method and apparatus, a processor and a storage medium.

BACKGROUND

With the emergence of new traffic such as industrial automation, vehicle to everything, remote control, smart grid, virtual reality and so on, higher requirements are put forward for delay of the wireless communication system for bearing the traffic. For example, an air interface delay of 1 ms or even 0.5 ms is required. Therefore, the 3rd Generation Partnership Project (3GPP) has gradually carried out research on low-delay related issues based on the Long Term Evolution (LTE)/LTE-Advanced (LTE-A) system and the New Generation (Fifth-generation, 5G) mobile communication system.

In the LTE/LTE-A system, a transmission time interval (TTI) is a basic unit of downlink and uplink transmission scheduling in the time domain. In order to satisfy low-delay traffic based on the LTE system, shortened TTI scheduling is defined in current standards, and each shortened TTI may include only 2 orthogonal frequency division multiplexing (OFDM) symbols. In the 5G system of the related art, in order to perform hybrid automatic repeat request (HARQ) faster, self-contained feedback needs to be implemented if necessary, and an uplink control symbol may have only one or two time domain symbols.

In the related art, in order to maintain a single carrier characteristic of an uplink control signal to support better uplink coverage and power amplifier efficiency, one solution is to send 1-bit ACK/NACK or 2-bit ACK/NACK on 1 or 2 symbols by using a design structure based on sequence selection. For example, for sending 1-bit ACK/NACK, the sequence 0 may be used to indicate ACK, the sequence 1 may be used to indicate NACK, and the receiving end may determine ACK or NACK according to the peak size. However, how to determine which sequence resources are specifically used to characterize ACK and which sequences are used to characterize NACK in order to improve performance as much as possible and avoid ambiguity caused by missed detection of a downlink control channel needs to be further solved. Meanwhile, when ACK/NACK is sent simultaneously with a scheduling request (SR), flexible configuration is also impossible.

SUMMARY

In view of the above, embodiments of the present disclosure intend to provide an information transmission method and apparatus, a processor and a storage medium so that sending resources of uplink information can be flexibly configured.

An information transmission method is provided in the embodiments of the present disclosure. The method includes: a terminal receiving radio resources configured by a network side; the terminal acquiring a resource set according to the radio resources; and the terminal sending uplink information by using one or more resource groups in the resource set; where the number of resource groups in the resource set is greater than or equal to 2.

An information transmission apparatus is further provided in the embodiments of the present disclosure, and includes a receiving module, an acquisition module and a sending module. The receiving module is configured to receive radio resources configured by a network side; the acquisition module is configured to acquire a resource set according to the radio resources; and the sending module is configured to send uplink information by using one or more resource groups in the resource set; where the number of resource groups in the resource set is greater than or equal to 2.

A storage medium is further provided in the embodiments of the present disclosure. The storage medium includes stored programs, where the programs, when executed, implement the information transmission method according to the embodiments of the present disclosure. A processor is further provided in the embodiments of the present disclosure. The processor is configured to execute programs, where the programs, when executed, implement the information transmission method according to the embodiments of the present disclosure.

An information transmission apparatus is further provided in the embodiments of the present disclosure. The apparatus includes a memory and a processor.

The memory is configured to store programs for information transmission.

The processor is configured to execute the programs, where the programs, when executed, implement the data sending method according to the embodiments of the present disclosure. Through the embodiments of the present disclosure, the dynamic multiplexing of multiple messages in the uplink information can be flexibly achieved, the problem that sending resources of the uplink information cannot be flexibly configured in the related art is solved, and the overhead of the uplink control information is reduced.

DETAILED DESCRIPTION

Hereinafter the present disclosure will be described in detail with reference to the drawings in conjunction with the embodiments. It is to be noted that if not in collision, the embodiments and features therein in the present disclosure may be combined with each other.

It is to be noted that the terms "first", "second" and the like in the description, claims and drawings of the present disclosure are used to distinguish between similar objects and are not necessarily used to describe a particular order or sequence.

Figure 1:
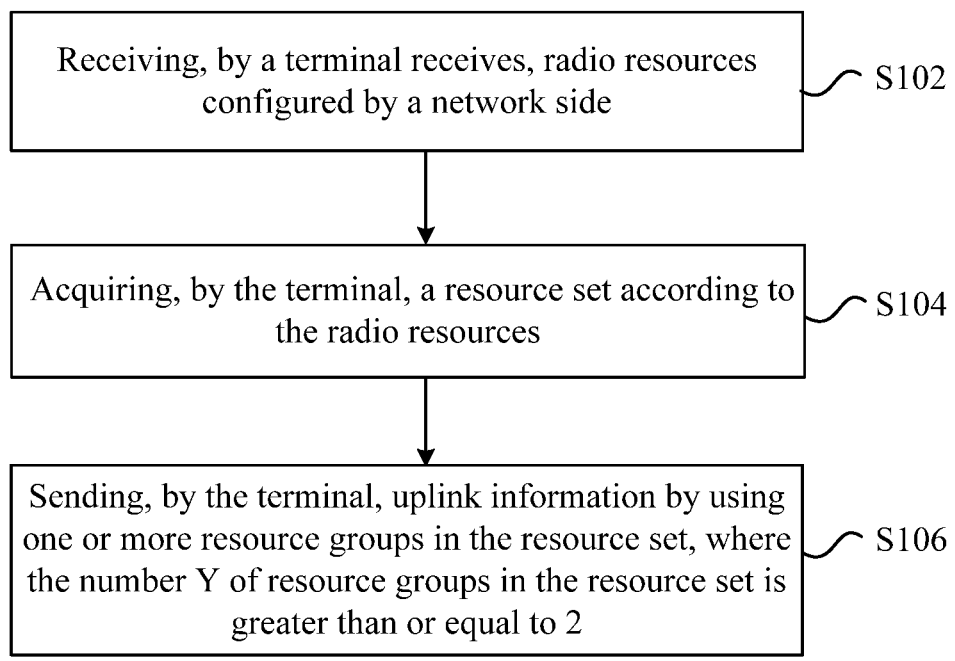
FIG. 1 is a flowchart of an information transmission method according to an embodiment of the present disclosure.

Network architecture of the embodiments of the present disclosure includes a base station and a terminal. Information interaction is performed between the base station and the terminal. An information transmission method executing on the above network architecture is provided in this embodiment. FIG. 1 is a flowchart of an information transmission method according to an embodiment of the present disclosure. As shown in FIG. 1, the process of the method includes steps described below.

In step S102, a terminal receives radio resources configured by a network side.

In step S104, the terminal acquires a resource set according to the radio resources.

In step S106, the terminal sends uplink information by using one or more resource groups in the resource set, where the number of resource groups in the resource set is greater than or equal to 2.

Through the above steps, the dynamic multiplexing of multiple messages in the uplink information can be flexibly achieved, the problem that sending resources of the uplink information cannot be flexibly configured in the related art is solved, and the overhead of the uplink control information is reduced.

In actual application, the above steps may, but may not necessarily, be executed by the terminal, such as a mobile phone.

In actual application, a resource group includes M resource elements, where M is an integer greater than or equal to 2, and the resource groups differ from each other by at least one resource element.

In an embodiment, the uplink information includes one of: acknowledgement (ACK)/negative acknowledgement (NACK) information about uplink control information, an uplink scheduling request (SR), or the ACK/NACK information and the scheduling request.

In an embodiment, a first resource element included in a resource group is at least one of: an initial value of the first resource element or an offset value of the initial value of the first resource element.

In an embodiment, an initial value of a radio resource or resource element is obtained according to an offset value in conjunction with a first implicit indication manner.

In an embodiment, the first implicit indication manner includes indicating through one or more of the following information: a control channel element index of a downlink control channel, a Band Width Part (BWP) index of a downlink system bandwidth block, or an index of a slot or symbol where the downlink control channel is located.

In an embodiment, the step in which the terminal acquires the resource set according to the radio resources includes: performing, by the terminal, randomization processing on the initial value of the first resource element to obtain a first resource value $x0$. Where a manner of randomization includes indicating through one or more of the following information: a cell physical identity (ID), a cell virtual ID, an index of a slot where uplink control is located, an index of a symbol where the uplink control is located, a pseudo-random sequence, an index of a slot where a downlink traffic channel is located, or an index of a symbol where downlink traffic is located.

In an embodiment, the method further includes: obtaining, by the terminal, a first resource value set by using the first resource value $x0$ through a second implicit indication manner.

In an embodiment, the second implicit indication manner includes: optionally, for others in the first resource value set, when the terminal only sends a scheduling request, the terminal sends the scheduling request by using the first resource value $x0$ in conjunction with resource elements in the resource group.

In an embodiment, when the terminal only sends ACK/NACK information, the terminal sends the ACK/NACK information by selecting one first resource value in the first resource value set according to a state of the uplink information and combining resource elements in the resource group.

In an embodiment, when the terminal simultaneously sends a scheduling request and ACK/NACK information, the terminal uses part of resource elements of the scheduling request configured by the network side and part of resource elements of the ACK/NACK information configured by the network side to send one of: the scheduling request and the ACK/NACK information, or the ACK/NACK information.

In an embodiment, the part of resource elements of the scheduling request configured by the network side includes at least one of: a sequence initial index, a resource block initial index, or a starting symbol index.

In an embodiment, the part of resource elements of the ACK/NACK information configured by the network side includes at least one of: a starting slot position, a starting time domain symbol index, the number of time domain symbols, a time domain orthogonal cover code index, or a frequency hopping enabling indication.

Exemplarily, a first resource value is a phase rotation value of a sequence, and the first resource value set includes phase rotation values, defined as $\{x0, x1, x2, x3\}$, of four sequences.

Exemplarily, the second implicit indication manner includes the following: in condition that a sending information bit is 1 bit, $x1=(x0+N/2) \bmod N$, where N is a sequence length; in condition that the sending information bit is 2 bits, $x1=(x0+N/4) \bmod N$, $x2=(x0+3*N/4) \bmod N$, and $x3=(x0+N/2) \bmod N$, or $x1=(x0+3*N/4) \bmod N$, $x2=(x0+N/4) \bmod N$, and $x3=(x0+N/2) \bmod N$, where N is an integer greater than 1.

Exemplarily, the second implicit indication manner includes the following: $x1=(x0+N/4) \bmod$, $x2=(x0+3*N/4) \bmod N$, and $x3=(x0+N/2) \bmod N$, or $x1=(x0+3*N/4) \bmod N$, $x2=(x0+N/4) \bmod N$, and $x3=(x0+N/2) \bmod N$, where N is an integer greater than 1.

Exemplarily, the second implicit indication manner includes the following: $x1=(x0+N/4) \bmod N$, $x2=(x0+N/2) \bmod N$, and $x3=(x0+3*N/4) \bmod N$, or $x1=(x0+3*N/4) \bmod N$, $x2=(x0+N/2) \bmod N$, and $x3=(x0+N/4) \bmod N$, where N is an integer greater than 1.

Exemplarily, a user terminal is notified through high-layer signaling of a strategy for selecting the second implicit indication manner.

Exemplarily, information bits corresponding to the phase rotation values {x0, x1, x2, x3} are respectively {'00', '01', '10', '11'}, or {'00','01', '11', '10'}. In an embodiment, the four sequences obtained according to the phase rotation values {x0, x1, x2, x31} are respectively defined as {$x_0$ (n) $x_1$ (n) $x_2$ (n) $x_3$ (n)}, where a method for selecting a sequence when the terminal sends the uplink information includes what is described below.

In condition that the uplink information has 1 bit, $$y(n) = x_j(n)$$
$$j = 3 \cdot b(0)$$

In condition that the uplink information has 2 bits, $$y(n) = x_j(n)$$
$$j = \sum_{i=0}^{M_{bit}-1} b(i) \cdot 2^i$$

b(0), . . . , b($M_{bit}$−1) is an information bit of 0 or 1, $M_{bit}$ is a number of bits, y(n) is the sequence selected by the terminal, and $x_j$ (n) is an element of set {$x_0$ (n) $x_1$(n) $x_2$ (n) $x_3$ (n)}. In an embodiment, in condition that feedback information corresponding to data information sent by the network side at a first time position n1 and a second time position n2 are both sent at a third time position n3 of the terminal, first resource values x0 used by the terminal for the feedback information of the data at the first time position n1 and the feedback information of the data at the second time position n2 are the same.

In an embodiment, in response to determining that a user terminal detects control information of scheduling data only at the first time position n1, the user terminal sends feedback information by using a sequence corresponding to {'00', '10'}; in response to determining that the user terminal detects control information of scheduling data only at the second time position n2, the user terminal sends feedback information by using a sequence corresponding to {'00', '01'}; and in response to determining that the user terminal detects control information of scheduling data at both the first time position n1 and the second time position n2, the user terminal sends the feedback information by using a sequence corresponding to {'00', '01', '10', '11'}.

In an embodiment, in response to determining that a user terminal detects control information of scheduling data only at the first time position n1, the user terminal sends feedback information by using {x0, x2}; in response to determining that the user terminal detects control information of scheduling data only at the second time position n2, the user terminal sends feedback information by using {x0, x2}; and in response to determining that the user terminal detects control information of scheduling data at both the first time position n1 and the second time position n2, the user terminal sends the feedback information by using {x0, x1, x2, x3}.

In an embodiment, in response to determining that a user terminal detects control information of scheduling data only at the first time position n1, the user terminal sends feedback information by using {x0, x1}; in response to determining that the user terminal detects control information of scheduling data only at the second time position n2, the user terminal sends feedback information by using {x0, x2}; and in response to determining that the user terminal detects control information of scheduling data at both the first time position n1 and the second time position n2, the user terminal sends the feedback information by using {x0, x1, x2, x3}.

In an embodiment, in response to determining that time domain resources corresponding to radio resources of a scheduling request configured by a network are different from time domain resources corresponding to radio resources of hybrid automatic repeat request-acknowledgement (HARQ-ACK) configured by the network and part of symbols overlap, the terminal sends a HARQ-ACK message on the overlapping part of symbols by using a resource of the SR.

In an embodiment, in response to determining that time domain resources corresponding to radio resources of an SR configured by a network are different from time domain resources corresponding to radio resources of HARQ-ACK configured by the network and part of symbols overlap, and if a non-overlapping SR symbol exists, the terminal sends an SR message on the non-overlapping SR symbol by using a resource of the SR; and if a non-overlapping HARQ-ACK symbol exists, the terminal sends a HARQ-ACK message on the non-overlapping HARQ-ACK symbol by using a resource of the HARQ-ACK.

Exemplarily, the number of bits of the HARQ-ACK is 1 or 2.

In an embodiment, in response to determining that time domain resources corresponding to radio resources of an SR configured by a network are different from time domain resources corresponding to radio resources of HARQ-ACK configured by the network and part of symbols overlap, the SR is added as one bit after or before a HARQ-ACK information bit, and after processing such as encoding, the terminal only sends a HARQ-ACK bit and an SR bit on HARQ-ACK resources of the overlapping part of symbols, or the terminal sends the HARQ-ACK bit and the SR bit on HARQ-ACK resources of all HARQ-ACK symbols. The number of bits of the HARQ-ACK is greater than 2.

In an embodiment, in response to determining that time domain resources corresponding to radio resources of an SR configured by a network are different from time domain resources corresponding to radio resources of HARQ-ACK configured by the network and part of symbols overlap, and if a time domain symbol length of SR resources is greater than or equal to a symbol length of HARQ-ACK resources, the terminal discards sending of the SR on an overlapping symbol and sends the HARQ-ACK on the overlapping symbol; and if the time domain symbol length of the SR resources is less than or equal to the symbol length of the HARQ-ACK resources, the terminal discards sending of the HARQ-ACK on the overlapping symbol and sends the SR on the overlapping symbol.

In an embodiment, at least one resource or resource group exists in radio resources of HARQ-ACK configured by a network, and time domain resources corresponding to the radio resources of the HARQ-ACK are the same as time domain resources corresponding to radio resources of an SR configured by the network.

From the description of the above-mentioned embodiments, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

An information transmission apparatus is further provided in an embodiment of the present disclosure. The apparatus is configured to implement the above-mentioned information transmission method, and what has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceivable.

Figure 2:
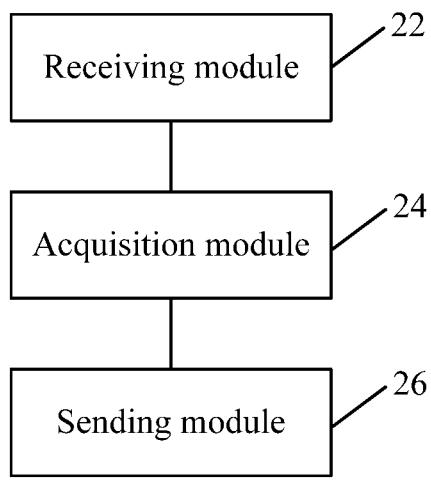
FIG. 2 is a structural block diagram of an information transmission apparatus according to an embodiment of the present disclosure.

FIG. 2 is a structural block diagram of an information transmission apparatus according to an embodiment of the present disclosure. As shown in FIG. 2, the apparatus includes: a receiving module 22, an acquisition module 24 and a sending module 26.

The receiving module 22 is configured to receive radio resources configured by a network side. The acquisition module 24 is configured to acquire a resource set according to the radio resources. The sending module 26 is configured to send uplink information by using one or more resource groups in the resource set; where the number of resource groups in the resource set is greater than or equal to 2.

In an embodiment, a resource group includes M resource elements, where M is an integer greater than or equal to 2; the resource groups differ from each other by at least one resource element. In an embodiment, the uplink information includes one of: acknowledgement (ACK)/negative acknowledgement (NACK) information about uplink control information, an uplink scheduling request, or the ACK/NACK information and the scheduling request.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

This embodiment is an optional embodiment of the present application and used for describing the present application in detail in conjunction with specific implementation modes.

In order to maintain a single carrier characteristic of an uplink control signal to support better uplink coverage and power amplifier efficiency, one solution is to send 1-bit ACK/NACK or 2-bit ACK/NACK on 1 or 2 symbols by using a design structure based on sequence selection. For example, for sending 1-bit ACK/NACK, the sequence 0 may be used to indicate ACK, the sequence 1 may be used to indicate NACK, and the receiving end may determine ACK or NACK according to the peak size. However, how to determine which sequence resources are specifically used to characterize ACK and which sequences are used to characterize NACK in order to improve performance as much as possible and avoid ambiguity caused by missed detection of a downlink control channel needs to be solved. Meanwhile, when ACK/NACK and the scheduling request (SR) are sent simultaneously, a resource of the SR can be used to send ACK/NACK. However, the resource allocation methods used by the ACK/NACK and the SR may be different, for example, the SR resource is configured by radio resource control (RRC) signaling, and the ACK/NACK is determined by RRC signaling and physical layer dynamic signaling. At this time, how to determine the resources used for sending the SR and the ACK/NACK simultaneously to achieve flexible sending also needs to be solved.

Based on the above problem existing in the related art, this embodiment provides the following implementation modes.

Implementation Mode One

A network configures an initial cyclic shift (CS) index CS_0 of a sequence to a user terminal, and the user terminal performs randomization on the CS_0. The randomization formula may be $x_0=[n_{cs}^{cell}(n_s, l)+CS\_0]$ mod N. $n_{cs}^{cell}(n_s, l)$ is a randomization factor associated with slot index $n_s$, symbol index l, and the cell ID. The phase of the sequence may be further obtained as $a_0=2\pi\cdot x_0/N$ according to the index. Four sequences are defined as $\{x_0(n)\ x_1(n)\ x_2(n)\ x_3(n)\}$, where $x_0(n)$ is the sequence with a cyclic shift index being $x_0$, i.e., the phase is $a_0$. The binary information bits to be sent are defined as $b(0), \ldots, b(M_{bit}-1)$, where $M_{bit} \in \{1,2\}$ is the number of bits of information. The sending sequence when the user sends information bits of different states is shown in formula (1):

$$y(n) = x_j(n) \qquad (1)$$
$$j = \sum_{i=0}^{M_{bit}-1} b(i)\cdot 2^i .$$

Assuming that N=12, when the information to be sent is 1-bit information, $x_1=(x_0+6)\mod 12$; when the information to be sent is 2-bit information, $x_1=(x_0+3)\mod 12$, $x_2=(x_0+9)\mod 12$; $x_3=(x_0+6)\mod 12$, or $x_1=(x_0+9)\mod 12$, $x_2=(x_0+3)\mod 12$, and $x_3=(x_0+6)\mod 12$. $x_1$, $x_2$, and $x_3$ respectively correspond to sequence $x_1(n)$, sequence $x_2(n)$ and sequence $x_3(n)$.

The sequence selection method provided in this implementation mode can achieve that the sequence phase distance between information bits is maximum and accords with Gray mapping, thereby improving the sending performance.

Implementation Mode Two

A network configures an initial cyclic shift value CS_0 of a sequence to a user terminal, i.e., the initial cyclic shift value is the initial value of the resource or resource element in the present disclosure. The user terminal performs randomization processing on CS_0, and the randomization formula may be $x_0=[n(n_{cs}^{cell}(n_s, l)+CS\_0]$ mod N. $n_{cs}^{cell}(n_s, l)$ is a randomization factor associated with slot index $n_s$, symbol index l, and the cell ID. The phase of the sequence may be further obtained as $a_0=2\pi\cdot x_0/N$ according to the index. Four sequences are defined as $\{x_0(n)\ x_1(n)\ x_2(n)\ x_3(n)\}$ where $x_0(n)$ is the sequence with a cyclic shift value being $x_0$, i.e., the phase is $a_0$. $x_1=(x_0+3)\mod 12$, $x_2=(x_0+9)\mod 12$, and $x_3=(x_0+6)\mod 12$, or $x_1=(x_0+9)\mod 12$, $x_2=(x_0+3)\mod 12$, and $x_3=(x_0+6)\mod 12$. $x_1$, $x_2$, and $x_3$ respectively correspond to sequence $x_1(n)$, sequence $x_2(n)$ and sequence $x_3(n)$.

The information bits to be sent are defined as $b(0), \ldots, b(M_{bit}-1)$, where $M_{bit} \in \{1,2\}$ is the number of bits of information, and y(n) is a sequence selected by the terminal.

The sending sequence when the user sends information bits of different states is determined according to a rule described below.

When 1 bit is sent, $$y(n) = x_j(n)$$
$$j = 3 \cdot b(0)$$ ;

When 2 bits are sent, $$y(n) = x_j(n)$$
$$j = \sum_{i=0}^{M_{bit}-1} b(i) \cdot 2^i$$ ;

or when 1 to 2 bits are sent, it is uniformly represented as $$y(n) = x_j(n)$$
$$j = \sum_{i=0}^{M_{bit}-1} b(i) \cdot 2^i \cdot 3^{2-2^{M_{bit}-1}},$$

0 3 6 9.

Implementation Mode Three

Figure 3:
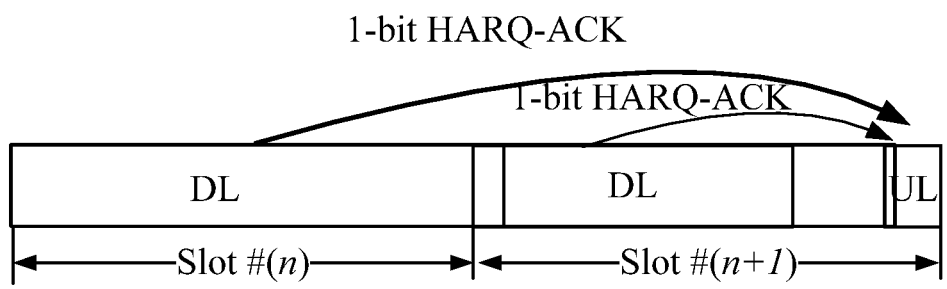
FIG. 3 is a schematic diagram illustrating that HARQ-ACK feedback corresponding to two downlink data transmissions corresponds to one uplink control channel according to an embodiment of the present disclosure.

FIG. 3 is a schematic diagram illustrating that HARQ-ACK feedback corresponding to two down link (DL) data transmissions corresponds to one uplink control channel according to an embodiment of the present disclosure. In FIG. 3, 1-bit HARQ-ACK corresponding to the downlink data in downlink slot #n and 1-bit HARQ-ACK corresponding to the downlink data in downlink slot #(n+1) are both fed back in the short PUCCH. At this time, if a control channel corresponding to downlink data is not detected, a case may exist where the channel resources used by the user are inconsistent with the channel resources understood by the base station. One solution is to assume that the four sequence resources obtained by the user through the method of the present disclosure are respectively {x0, x1, x2, x3}, corresponding to the bit states '00', '01', '10', and '11', respectively. At this time, if the user only detects downlink data in slot #n, the user can select only one resource from {x0, x2} to send, and at this time, even if the base station sends data to the user in slot #(n+1) and the data misses detection by the user, '00' or '10' is determined by the base station, where the first bit corresponds to the downlink data in slot #n, and the second bit corresponds to the downlink data in slot #(n+1), so the base station triggers retransmission of the downlink data in slot #(n+1). Of course, if the base station does not send data to the user in slot #(n+1), the base station determines {x0, x2} as '0' or '1' separately. Similarly, if the base station user only detects downlink data in slot #(n+1), the user can select one resource from {x0, x1} to send, and even if the base station sends data to the user in slot #n and the data misses detection by the user, the base station can also recognize such situation. If the user detects data sending simultaneously in slot #n and slot #(n+1), the user can select one of the available resources {x0, x1, x2, x3} for sending.

In particular, four sequence resources are respectively sequence time domain cyclic shift values {0, 3, 9, 6} or {1, 4, 10, 7} or {2, 5, 11, 8}. It is noted that the cyclic shift value in the time domain is equal to the rotation value of the phase.

The method described above requires that the initial values of the sequence resources allocated by the base station to the two slots are the same, as x0 in the above example, and configures the user with four resources or defines that the user acquires four resources regardless of whether data transmission exists in slot #n and slot #(n+1).

Equivalently, the above method configures a feedback codebook of a fixed size for the network, at this time the user always feeds back with 2-bit HARQ-ACK, and once the control channel of a certain slot misses detection, NACK is used for processing.

The other solution is that the sequence resources allocated to the two slots by the base station are different, the base station determines the information sent by the user through more blind detection, at this time, the resource overhead is high, and blind detection of the base station is also introduced, increasing the complexity and reducing the performance.

Implementation Mode Four

When a network configures that a user sends an ACK/NACK message of 1 to 2 bits by using a short PUCCH, the user sends the ACK/NACK message of 1 to 2 bits in a sequence selection manner, and at this time, the base station needs to configure 2 or 4 sequences for the user. In order to achieve multiplexing of the SR and the ACK/NACK message, two or four SR resources need to be configured, and when the SR and the ACK/NACK message are simultaneously sent, the ACK/NACK message is sent by using the configured SR resources. In order to save the SR configuration overhead, the present implementation mode indicates that the network can configure a default channel resource to the SR by using RRC signaling, where the resource mainly includes a starting symbol index, the number of symbols included in a control channel, a starting resource block (RB) index, the number of RBs (which may be 1 by default), frequency hopping enabling, an initial cyclic shift index and other resource elements. When only the SR is sent, the user sends the SR by using the default resource.

Meanwhile, the user acquires the first channel resource set according to a network defined rule. That is, an initial CS index is first randomized to obtain a sequence index (one first channel resource value) and then a sequence index set including 2 or 4 sequence indices is obtained. At this time, the randomization method and the first and second implicit manners used for the SR are the same as the randomization method and the first and second implicit manners used for the ACK/NACK, and methods similar to methods in embodiments 1 and 2 can be used.

If the user terminal needs to send the SR and the ACK/NACK simultaneously, the user can send the ACK/NACK message on the above defined SR resource. Alternatively, the user terminal only uses the cyclic shift index of the SR, while for the remaining channel resource elements associated with the short PUCCH, the user terminal uses resource elements configured to send the ACK/NACK, such as a starting symbol index, the number of symbols included in the control channel, a starting RB index, the number of RBs (which may be 1 by default), and frequency hopping enabling. Since the resource elements for sending the ACK/NACK may be dynamically changed, the method can more dynamically adjust information about the resource for sending the SR and the ACK/ACK, such as the length of the PUCCH, to achieve the benefit of saving power or improving coverage.

Implementation Mode Five

When a network configures a long PUCCH for a user to send an ACK/NACK message of 1 to 2 bits, in the implementation mode, it is indicated that the network can configure a default channel resource for the SR by using RRC signaling, where the resource mainly includes a starting slot index, a starting symbol index, the number of symbols included in a control channel, a starting RB index, the number of RBs (which may be 1 by default), frequency hopping enabling, a cyclic shift (CS) index, an orthogonal cover code (OCC) index and other resource elements. When only the SR is sent, the user sends the SR by using the default resource.

At the same time, the network also configures a long PUCCH resource for the user to send an ACK/NACK message of 1 to 2 bits, and the included resource elements are the same as those for the SR.

If the user terminal needs to send the SR and the ACK/NACK simultaneously, the user can send the ACK/NACK message on the above defined SR resource. Alternatively, the user terminal only uses the cyclic shift index, the RB index and the starting symbol index of the SR, and the remaining resource elements are the same as the resource elements configured to send the ACK/NACK, such as the number of symbols included in the control channel and frequency hopping enabling. Since the resource elements for sending the ACK/NACK may be dynamically changed, the method can more dynamically adjust information about the resource for sending the SR and the ACK/ACK, such as the length of the PUCCH, to achieve the benefit of saving power or improving coverage. Alternatively, the user notifies the user of the behavior when the SR and the ACK/NACK are simultaneously sent, and the notification is performed in a manner of 1-bit dynamic indication or RRC configuration or implicit indication. That is, it is decided at this time whether to send using all resources of the SR, or to send using only part of resources of the SR and part of resources of the ACK/NACK.

Implementation Mode Six

As shown in FIG. 3, if the user only needs to feed back 1-bit ACK/NACK at slot #n, the user separately acquires two sequence resources {x0, x2} from the network corresponding to bit states '0' and '1', respectively. The user is configured to acquire at slot #(n+1) four sequence resources {x0, x1, x2, x3} from the network corresponding to bit states '00', '01', '10', '11', respectively. If the network sends data to the user at both slot #n and slot #(n+1), but the user only receives the data at slot #n, the user will select a resource from {x0, x2} to send, and the base station will determine the resource as '00' or '10', i.e., the missed detection can be determined as NACK at this time, and the data will not be lost.

In an embodiment, the sequence resources {x0, x1, x2, x3} correspond to sequence cyclic shifts {0, 3, 6, 9}, respectively. This embodiment requires that the sequence resources used at slot #n be the same as the sequence resources corresponding to states '00' and '10' at slot #(n+1).

The network notifies the user in a manner of explicit indication through downlink control information or RRC configuration or implicit indication that if data sending is detected only in slot #(n+1), the user always send 2-bit information, and it is assumed that NACK is always fed back in slot #n. More generally, when the user feeds back ACK/NACK on the same time-frequency resource for data transmission at multiple moments, and the user detects data transmission only at the last transmission moment, the user assumes that data transmission exists at all previous moments and is processed as NACK.

The method of the present disclosure can flexibly achieve dynamic multiplexing of the SR and the ACK/NACK message. The overhead of the uplink control information can be reduced and the ambiguity problem caused by the loss of the downlink control channel of the base station and the UE is avoided.

Implementation Mode Seven

Figure 4:
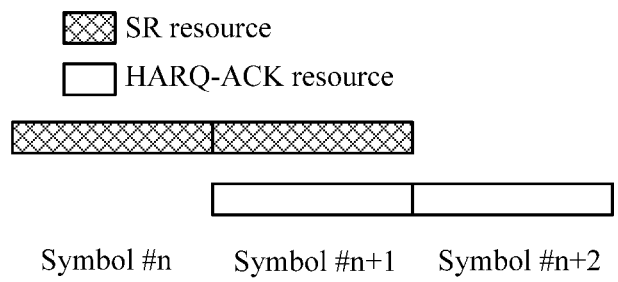
FIG. 4 is a schematic diagram 1 in which SR and HARQ-ACK resources overlap on part of symbols according to an embodiment.

FIG. 4 is a schematic diagram 1 in which SR and HARQ-ACK resources overlap on part of symbols according to an embodiment. The time domain resources configured by the network for the SR are symbol #n and symbol #n+1, and the time domain resources allocated to the short PUCCH for sending the HARQ-ACK are symbol #n+1 and symbol #n+2. At this time, if the user sends only the SR, the user sends SR information on resources of the SR. If the user sends only HARQ-ACK information, the HARQ-ACK is sent on resources allocated to the HARQ-ACK.

If the user needs to simultaneously send the SR and HARQ-ACK information of 1 or 2 bits, one method is that the user sends the SR on symbol #n by using the resource of the SR, HARQ-ACK on symbol #n+1 by using the resource of the SR, and the HARQ-ACK on symbol #n+2 by using the resource of the HARQ-ACK. Alternatively, the user sends the HARQ-ACK only on symbol #n+1 by using the resource of the SR.

If the user needs to simultaneously send the SR and HARQ-ACK information of more than 2 bits, one method is that the user sends the SR on symbol #n by using the resource of the SR. On symbol #n+1 and symbol #n+2, the SR is attached as 1 bit (which may be 1 bit or more if various SR configurations exist) to the HARQ-ACK bit and then sent on the resources of the HARQ-ACK. Alternatively, only on symbol #n+1 and symbol #n+2, the SR is attached by the user as 1 bit (which may be 1 bit or more if various SR configurations exist) to the HARQ-ACK bit and then encoded and sent.

The frequency domain resources of the SR and HARQ-ACK resources are not shown in FIG. 4, and specifically the same RB resources may be used for different symbols, or frequency hopping may exist between symbols.

Implementation Mode Eight

Figure 5:
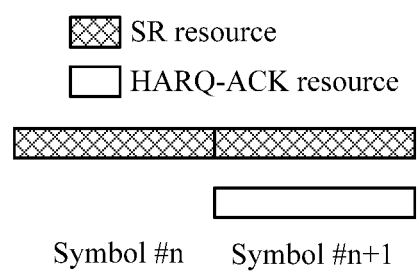
FIG. 5 is a schematic diagram 2 in which SR and HARQ-ACK resources overlap on part of symbols according to an embodiment.

FIG. 5 is a schematic diagram 2 in which SR and HARQ-ACK resources overlap on part of symbols according to an embodiment. The time domain resources configured by the network for the SR are symbol #n and symbol #n+1, and the time domain resource allocated to the short PUCCH for sending the HARQ-ACK is symbol #n+1. At this time, if the user sends only the SR, the user sends SR information on resources of the SR. If the user sends only HARQ-ACK information, the HARQ-ACK is sent on the resource allocated to the HARQ-ACK. If the user needs to simultaneously send the SR and HARQ-ACK information of 1 or 2 bits, one method is that the user sends the SR on symbol #n by using the resource of the SR and sends HARQ-ACK on symbol #n+1 by using the resource of the SR. Alternatively, the user sends the HARQ-ACK only on symbol #n+1 by using the resource of the SR.

If the user needs to simultaneously send the SR and HARQ-ACK information of more than 2 bits, one method is that the user sends the SR on symbol #n by using the resource of the SR. On symbol #n+1, the SR is attached as one bit to the HARQ-ACK bit and then sent on the resource of the HARQ-ACK. Alternatively, only on symbol #n+1, the SR is attached as one bit by the user to the HARQ-ACK bit and then encoded and sent.

Implementation Mode Nine

Figure 6:
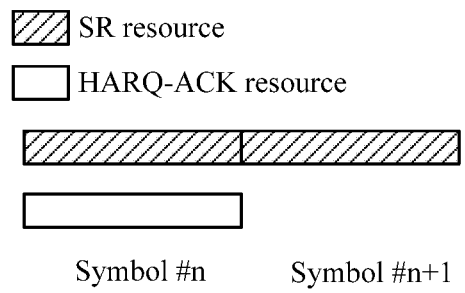
FIG. 6 is a schematic diagram 3 in which SR and HARQ-ACK resources overlap on part of symbols according to an embodiment.

FIG. 6 is a schematic diagram 3 in which SR and HARQ-ACK resources overlap on part of symbols according to an embodiment. In FIG. 6, the time domain resources configured by the network for the SR are symbol #n and symbol #n+1, and the time domain resource allocated to the short PUCCH for sending the HARQ-ACK is symbol #n. At this time, if the user sends only the SR, the user sends SR information on resources of the SR. If the user sends only HARQ-ACK information, the HARQ-ACK is sent on the resource allocated to the HARQ-ACK.

If the user needs to simultaneously send the SR and HARQ-ACK information of 1 or 2 bits, one method is that the user sends the SR on symbol #n+1 by using the resource of the SR and sends HARQ-ACK on symbol #n by using the resource of the SR. Alternatively, the user sends the HARQ-ACK only on symbol #n by using the resource of the SR.

If the user needs to simultaneously send the SR and HARQ-ACK information of more than 2 bits, one method is that the user sends the SR on symbol #n+1 by using the resource of the SR. On symbol #n, the SR is attached as one bit to the HARQ-ACK bit and then sent on the resource of the HARQ-ACK. Alternatively, only on symbol #n, the SR is attached as one bit by the user to the HARQ-ACK bit and then encoded and sent.

Implementation Mode Ten

Figure 7:
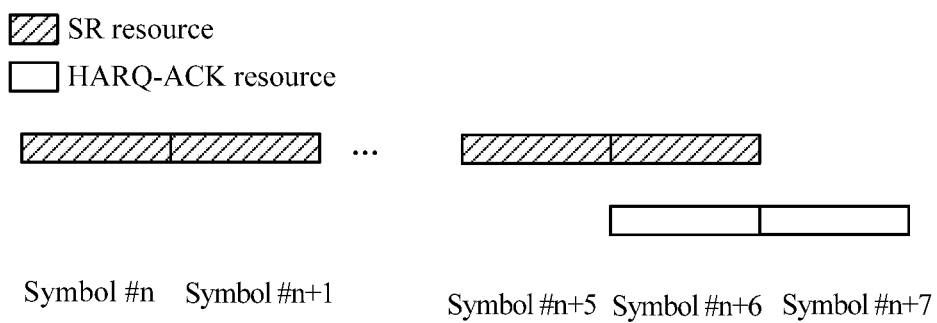
FIG. 7 is a schematic diagram 4 in which SR and HARQ-ACK resources overlap on part of symbols according to an embodiment.

FIG. 7 is a schematic diagram 4 in which SR and HARQ-ACK resources overlap on part of symbols according to an embodiment. In FIG. 7, the time domain resources configured by the network for the SR are symbols #n to #n+6, and the time domain resources allocated to the short PUCCH for sending the HARQ-ACK are symbols #n+6 and #n+7. At this time, if the user sends only the SR, the user sends SR information on resources of the SR. If the user sends only HARQ-ACK information, the HARQ-ACK is sent on the resources allocated to the HARQ-ACK.

If the user needs to simultaneously send the SR and HARQ-ACK information of 1 or 2 bits, one method is that the user sends the SR on symbols #n to #n+5 by using the resources of the SR, HARQ-ACK on symbol #n+6 by using the resource of the SR, and the HARQ-ACK on symbol #n+7 by using the resource of the HARQ-ACK. Alternatively, the user sends the HARQ-ACK only on symbol #n+6 by using the resource of the SR. Alternatively, the user sends the SR on symbols #n to #n+5 by using the resources of the SR, and sends the HARQ-ACK on symbols #n+6 and #n+7 by using the resources of the HARQ-ACK, i.e., part of SR symbols are discarded to achieve time division multiplexing of the resources of the SR and the resources of the HARQ-ACK.

If the user needs to simultaneously send the SR and HARQ-ACK information of more than 2 bits, one method is that the user uses the time division multiplexing method. Alternatively, on symbols #n+6 and #n+7, the SR is attached as one bit by the user to the HARQ-ACK bit and then sent on the resources of the HARQ-ACK.

Similarly, if the number of time domain resource symbols configured by the network for the HARQ-ACK is greater than 2 and the length is greater than the number of time domain symbols configured for SR resources, HARQ-ACK may be discarded on overlapping symbols and SR resources may be transmitted.

Implementation Mode Eleven

In order to avoid overlapping of the time domain resources of the SR resources and the time domain resources of the HARQ-ACK resources, at least one or one group of resources among resources configured by the network for the HARQ-ACK is at least the same as the SR time domain resources under one type of SR configuration. The time domain resource may be one or a combination of the following: a starting symbol index in a time domain or the number of symbols in the time domain.

The network configures a resource set to the PUCCH carrying the HARQ-ACK, where the time domain resource of the default first resource among the resources is the same as the time domain resource of the SR. Alternatively, the network configures a resource for the HARQ-ACK, where the time domain resource of the resource is the same as the time domain resource of the SR, but the HARQ-ACK resource is not in the resource set for the HARQ-ACK.

The methods described in implementation modes 7 to 11 of the present disclosure may be combined arbitrarily.

Implementation Mode Twelve

In a shortened Transmission Time Interval (sTTI), the length of the sTTI is less than 14 symbols. In general, if each sTTI has a Demodulation Reference Signal (DM-RS), the DM-RS overhead is large considering that the number of symbols of the sTTI is small. In particular, when the sTTI is configured to be in a semi-persistent scheduling (SPS) operation and the SPS period is one sTTI, it is necessary to reduce the DM-RS overhead, such as changing the pattern of a downlink Demodulation Reference Signal (DM-RS) of two consecutive sTTIs from R|SR to R|D, where | indicates a sTTI boundary. That is, in two consecutive sTTIs, one sTTI is configured with a DM-RS and the other sTTI is not configured with a DM-RS.

Due to the randomness of data arrival, when data arrives at the sTTI without the DM-RS, the transmitting end cannot perform sending until the latest sTTI with the DM-RS after delay for a period of time, which apparently increases the transmission delay of the data. The other possibility is that the transmitting end falls back to sending data according to the sTTI with the DM-RS, so that although the delay is not reduced, the receiving end needs to perform detection according to two possibilities, and the processing implementation complexity is increased.

When the SPS period of the sTTI is one sTTI and after the transmitting terminal sends data in the sTTI which is not configured with the DM-RS, the data is sent in the following first sTTI according to the sTTI which is configured with the DM-RS, and if the transmitting end does not send the data, an empty packet is sent.

The method described in the above implementation mode may be used for uplink or downlink SPS data sending. A plurality of different DM-RS patterns may be defined over a plurality of consecutive sTTIs.

In an embodiment, the network notifies the user of the DM-RS pattern employed, e.g., R|R or R|D, within the sTTI in which the SPS is activated. Alternatively, the transmitting end always sends information according to one DM-RS pattern.

A storage medium is further provided in the embodiments of the present disclosure. The storage medium includes stored programs, where the programs, when executed, implement the information transmission method according to the embodiments of the present disclosure.

In an embodiment, the storage medium may be configured to store program codes for executing the steps described below.

In S1, radio resources configured by a network side are received.

In S2, a resource set is acquired according to the radio resources.

In S3, uplink information is sent by using one or more resource groups in the resource set; where the number of resource groups in the resource set is greater than or equal to 2.

In an embodiment, the storage medium described above may include, but is not limited to, a USB flash disk, a read-only memory (ROM), a random access memory (RAM), a mobile hard disk, a magnetic disk, an optical disk or another medium capable of storing program codes.

A processor is further provided in the embodiments of the present disclosure. The processor is configured to execute programs, where the programs, when executed, implement the steps of the information transmission method according to the embodiments of the present disclosure.

In an embodiment, the programs described above are used for executing the steps described below.

In S1, radio resources configured by a network side are received.

In S2, a resource set is acquired according to the radio resources.

In S3, uplink information is sent by using one or more resource groups in the resource set.

The number of resource groups in the resource set is greater than or equal to 2.

Apparently, those skilled in the art should know that each of the above-mentioned modules or steps of the present disclosure may be implemented by a general-purpose computing apparatus, the modules or steps may be concentrated on a single computing apparatus or distributed on a network formed by multiple computing apparatuses, and in an embodiment, the modules or steps may be implemented by program codes executable by the computing apparatuses, so that modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. Those skilled in the art can make various modifications and changes. Any modifications, equivalent substitutions, improvements and the like made within the principle of the present disclosure should fall within the scope of the present disclosure.

What is claimed is:

1. An information transmission method, comprising:
   receiving, by a terminal, radio resources configured by a network side;
   acquiring, by the terminal, a resource set according to the radio resources; and
   sending, by the terminal, uplink information by using one or more resource groups in the resource set;
   wherein a number Y of resource groups in the resource set is greater than or equal to 2;
   wherein each of the resource groups comprises M resource elements, wherein M is an integer greater than or equal to 2, and the resource groups differ from each other by at least one resource element;
   wherein in condition that feedback information corresponding to scheduling data sent by the network side at a first time position n1 and a second time position n2 are both sent at a third time position n3 of the terminal, at least one of the following is satisfied:
   in response to determining that a user terminal detects control information of the scheduling data only at the first time position n1, the user terminal sends feedback information by using a sequence corresponding to {'00', '10'};
   in response to determining that the user terminal detects control information of the scheduling data only at the second time position n2, the user terminal sends feedback information by using a sequence corresponding to {'00', '01'}; and
   in response to determining that the user terminal detects control information of the scheduling data both at the first time position n1 and the second time position n2, the user terminal sends the feedback information by using a sequence corresponding to {'00', '01', '10', '11'};
   wherein {'00', '01', '10', '11'} are different resource elements in one of the resource groups.

2. The method of claim 1, wherein the uplink information comprises one of: acknowledgement (ACK)/negative acknowledgement (NACK) information about uplink control information, an uplink scheduling request (SR), or the ACK/NACK information and the SR.

3. The method of claim 1, wherein a first resource element comprised in the each of the resource groups is at least one of: an initial value of the first resource element or an offset value of the initial value of the first resource element.

4. The method of claim 3, wherein an initial value of the radio resources is obtained according to an offset value in conjunction with a first implicit indication manner.

5. The method of claim 4, wherein the first implicit indication manner includes indicating through one or more of following information: a control channel element index of a downlink control channel, a bandwidth part (BWP) index of a downlink system bandwidth block, or an index of a slot or symbol where the downlink control channel is located.

6. The method of claim 3, wherein the acquiring, by the terminal, the resource set according to the radio resources comprises:
   performing, by the terminal, randomization processing on the initial value of the first resource element to obtain a first resource value x0, wherein a manner of randomization comprises indicating through one or more of following information: a cell physical identity (ID), a cell virtual ID, an index of a slot where uplink control is located, an index of a symbol where the uplink control is located, a pseudo-random sequence, an index of a slot where a downlink traffic channel is located, or an index of a symbol where downlink traffic is located.

7. The method of claim 6, wherein in response to determining that a user terminal detects control information of scheduling data only at the first time position n1, the user terminal sends feedback information by using {x0, x2}; in response to determining that the user terminal detects control information of scheduling data only at the second time position n2, the user terminal sends feedback information by using {x0, x1}; and in response to determining that the user terminal detects control information of scheduling data at both the first time position n1 and the second time position n2, the user terminal sends the feedback information by using {x0, x1, x2, x3}.

8. The method of claim 6, wherein in response to determining that a user terminal detects control information of scheduling data only at the first time position n1, the user terminal sends feedback information by using {x0, x1}; in response to determining that the user terminal detects control information of scheduling data only at the second time position n2, the user terminal sends feedback information by using {x0, x2}; and in response to determining that the user terminal detects control information of scheduling data at both the first time position n1 and the second time position n2, the user terminal sends the feedback information by using {x0, x1, x2, x3}.

9. A non-transitory computer readable storage medium, comprising stored programs, wherein the programs, when executed, execute the information transmission method of claim 1.

10. A processor, which is configured to execute programs, wherein the programs, when executed, execute the information transmission method of claim 1.

11. An information transmission apparatus, comprising:
a memory, which is configured to store programs for information transmission; and
a processor, which is configured to execute the programs, wherein the programs, when executed, implement the information transmission method of claim 1.

12. An information transmission apparatus, comprising:
at least one processor; and
a memory communicatively connected to the at least one processor;
wherein the memory stores instructions executable by the at least one processor to cause the at least one processor to perform:
receiving, by a terminal, radio resources configured by a network side;
acquiring, by the terminal, a resource set according to the radio resources; and
sending, by the terminal, uplink information by using one or more resource groups in the resource set;
wherein a number Y of resource groups in the resource set is greater than or equal to 2;
wherein each of the resource groups comprises M resource elements, wherein M is an integer greater than or equal to 2, and the resource groups differ from each other by at least one resource element
wherein in condition that feedback information corresponding to scheduling data sent by the network side at a first time position n1 and a second time position n2 are both sent at a third time position n3 of the terminal, at least one of the following is satisfied:
in response to determining that a user terminal detects control information of the scheduling data only at the first time position n1, the user terminal sends feedback information by using a sequence corresponding to {'00', '10'};
in response to determining that the user terminal detects control information of the scheduling data only at the second time position n2, the user terminal sends feedback information by using a sequence corresponding to {'00', '01'}; and
in response to determining that the user terminal detects control information of the scheduling data both at the first time position n1 and the second time position n2, the user terminal sends the feedback information by using a sequence corresponding to {'00', '01', '10', '11'};
wherein {'00', '01', '10', '11'} are different resource elements in one of the resource groups.

13. The apparatus of claim 12, wherein the uplink information comprises one of: acknowledgement (ACK)/negative acknowledgement (NACK) information about uplink control information, an uplink scheduling request (SR), or the ACK/NACK information and the scheduling request.

* * * * *